United States Patent
Chaudhry et al.

(10) Patent No.: US 7,584,346 B1
(45) Date of Patent: Sep. 1, 2009

(54) METHOD AND APPARATUS FOR SUPPORTING DIFFERENT MODES OF MULTI-THREADED SPECULATIVE EXECUTION

(75) Inventors: Shailender Chaudhry, San Francisco, CA (US); Marc Tremblay, Menlo Park, CA (US); Paul Caprioli, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 225 days.

(21) Appl. No.: 11/698,479

(22) Filed: Jan. 25, 2007

(51) Int. Cl.
*G06F 9/48* (2006.01)
*G06F 12/14* (2006.01)
(52) U.S. Cl. .................... 712/228; 711/156
(58) Field of Classification Search ............... 712/228; 711/156
See application file for complete search history.

(56) References Cited

U.S. PATENT DOCUMENTS

| | | | | |
|---|---|---|---|---|
| 6,076,157 A | * | 6/2000 | Borkenhagen et al. | 712/228 |
| 7,398,521 B2 | * | 7/2008 | Hoflehner et al. | 717/151 |
| 7,421,571 B2 | * | 9/2008 | Shoemaker | 712/228 |
| 2003/0033509 A1 | * | 2/2003 | Leibholz et al. | 712/228 |
| 2005/0027941 A1 | * | 2/2005 | Wang et al. | 711/121 |
| 2005/0060518 A1 | * | 3/2005 | Augsburg et al. | 712/214 |
| 2005/0251662 A1 | * | 11/2005 | Samra | 712/228 |
| 2006/0184946 A1 | * | 8/2006 | Bishop et al. | 718/102 |

OTHER PUBLICATIONS

Tullsen, Dean M. etal., Handling Long-latency Loads in a Simultaneous Multithreading Processor, 2001, IEEE, pp. 318-327.*

* cited by examiner

*Primary Examiner*—Eric Coleman
(74) *Attorney, Agent, or Firm*—Park, Vaughan & Fleming LLP; Anthony P. Jones (57) ABSTRACT

One embodiment of the present invention provides a system that supports different modes of multi-threaded speculative execution on a processor. The system starts with two or more threads executing in a first multi-threaded speculative-execution mode. The system then switches to a second multi-threaded speculative-execution mode by configuring circuits in the processor to enable a second multi-threaded speculative-execution mode. After configuring the circuits, the system next switches the threads from executing in the first multi-threaded speculative-execution mode to executing in the second multi-threaded speculative-execution mode.

18 Claims, 7 Drawing Sheets

METHOD AND APPARATUS FOR SUPPORTING DIFFERENT MODES OF MULTI-THREADED SPECULATIVE EXECUTION

BACKGROUND

1. Field of the Invention

The present invention relates to techniques for improving computer system performance. More specifically, the present invention relates to techniques for supporting different modes of multi-threaded speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference, such as a load operation, generates a cache miss, the subsequent access to level-two (L2) cache (or main memory) can require dozens or hundreds of clock cycles to complete, during which time the processor is typically idle, performing no useful work.

Some processors processor designers have suggested using "speculative-execution" to avoid pipeline stalls associated with cache misses. Two such proposed speculative-execution modes are: (1) execute-ahead mode and (2) scout mode. Execute-ahead mode operates as follows. During normal execution, the system issues instructions for execution in program order. Upon encountering a data-dependent stall condition during execution of an instruction, the system generates a checkpoint that can be used to return execution of the program to the point of the instruction. Next, the system executes subsequent instructions in the execute-ahead mode, wherein instructions that cannot be executed because of a data dependency are deferred, and wherein other non-deferred instructions are executed in program order.

When the unresolved data dependency is resolved during execute-ahead mode, the system enters a deferred-execution mode, wherein the system executes deferred instructions. If all of the deferred instructions are executed during this deferred-execution mode, the system returns to normal-execution mode to resume normal program execution from the point where the execute-ahead mode left off. Alternatively, if some deferred instructions were not executed during deferred-execution mode, the system returns to execute-ahead mode until the remaining unresolved data dependencies are resolved and the deferred instructions can be executed.

If the system encounters a non-data-dependent stall condition while executing in normal-execution mode or execute-ahead mode, the system moves into scout mode. In scout mode, instructions are speculatively executed to prefetch future loads and stores, but results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal-execution mode from the launch point instruction (the instruction that originally encountered the launch point stall condition).

By allowing the processor to perform work during stall conditions, speculative-execution can significantly increase the amount of computational work the processor completes.

In an effort to increase the effectiveness of speculative-execution, processor designers have suggested using processors that support multithreading to perform speculative-execution. One such design is a speculative multi-threaded (SMT) processor. On such processors, two or more speculative execution threads can operate independently of one another on the processor. SMT processors are most effective for applications where the threads are performing independent tasks. For example, because database queries are typically individual tasks, SMT processors tend to work well for databases.

Processor designers have also suggested using processors that support simultaneous speculative threading (SST). In such processors, a primary thread operates in normal mode and execute-ahead mode, while another thread trails the primary thread and executes instructions deferred by the primary thread in deferred mode. SST is described in more detail in a pending U.S. patent application entitled, "Method and Apparatus for Simultaneous Speculative Threading," by inventors Shailender Chaudhry, Marc Tremblay, and Paul Caprioli having Ser. No. 11/361,257, and filing date 24 Apr. 2006. SST designs are most effective where the processor is required to perform a single task at the highest possible speed.

Therefore, SMT processors are more effective in situations where multiple threads are performing independent tasks, and SST processors are more effective in situations where multiple threads are working on the same task.

Hence, what is needed is a method and an apparatus that provides the benefits of both an SMT processor and an SST processor.

SUMMARY

One embodiment of the present invention provides a system that supports different modes of multi-threaded speculative execution on a processor. The system starts with two or more threads executing in a first multi-threaded speculative-execution mode. The system then switches to a second multi-threaded speculative-execution mode by configuring circuits in the processor to enable a second multi-threaded speculative-execution mode. After configuring the circuits, the system next switches the threads from executing in the first multi-threaded speculative-execution mode to executing in the second multi-threaded speculative-execution mode.

In a variation on this embodiment, the multi-threaded speculative-execution modes include: (1) a simultaneous speculative threading mode, wherein each thread on the processor operates independently of other threads on the processor and wherein each thread supports all modes of speculative-execution; or (2) a simultaneous multi-threaded mode, wherein one or more primary threads execute instructions in a normal mode and an execute-ahead mode and a one or more additional threads execute instructions deferred by the primary threads in a deferred mode.

In a variation on this embodiment, the speculative-execution modes include: (1) an execute-ahead mode, wherein instructions that cannot be executed because of an unresolved data dependency are deferred, and wherein other non-deferred instructions are executed in program order; (2) a deferred mode wherein deferred instructions are executed in program order, and wherein deferred instructions that still cannot be executed because of unresolved data dependencies are deferred again; or (3) a scout mode wherein instructions are executed to prefetch loads and stores, but the results of the instructions are not committed to the architectural state of the processor.

In a variation on this embodiment, the system configures circuits by: (1) configuring register file copies to facilitate reads and writes between the register file copies required by the second multi-threaded speculative-execution mode; and (2) configuring a per-register status indicator array to enable the per-register status indicator array to store status information for the second multi-threaded speculative-execution mode.

In a variation on this embodiment, the status information for the second multi-threaded speculative-execution mode includes dependency information.

In a variation on this embodiment, while operating in the first multi-threaded speculative-execution mode the system monitors a mode indicator. If the mode indicator changes state, the system switches the processor to the second multi-threaded speculative-execution mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The following sections describe a processor that can be dynamically configured to operate in either the simultaneous speculative threading (SST) mode or the simultaneous multi-threaded (SMT) mode. For each of these modes, we describe the circuit structures used by the threads during operation in the mode and also how the processor transitions between different states while in each mode. We also discuss how a processor can be dynamically configured to operate in a specific mode.

Processor

Figure 1:
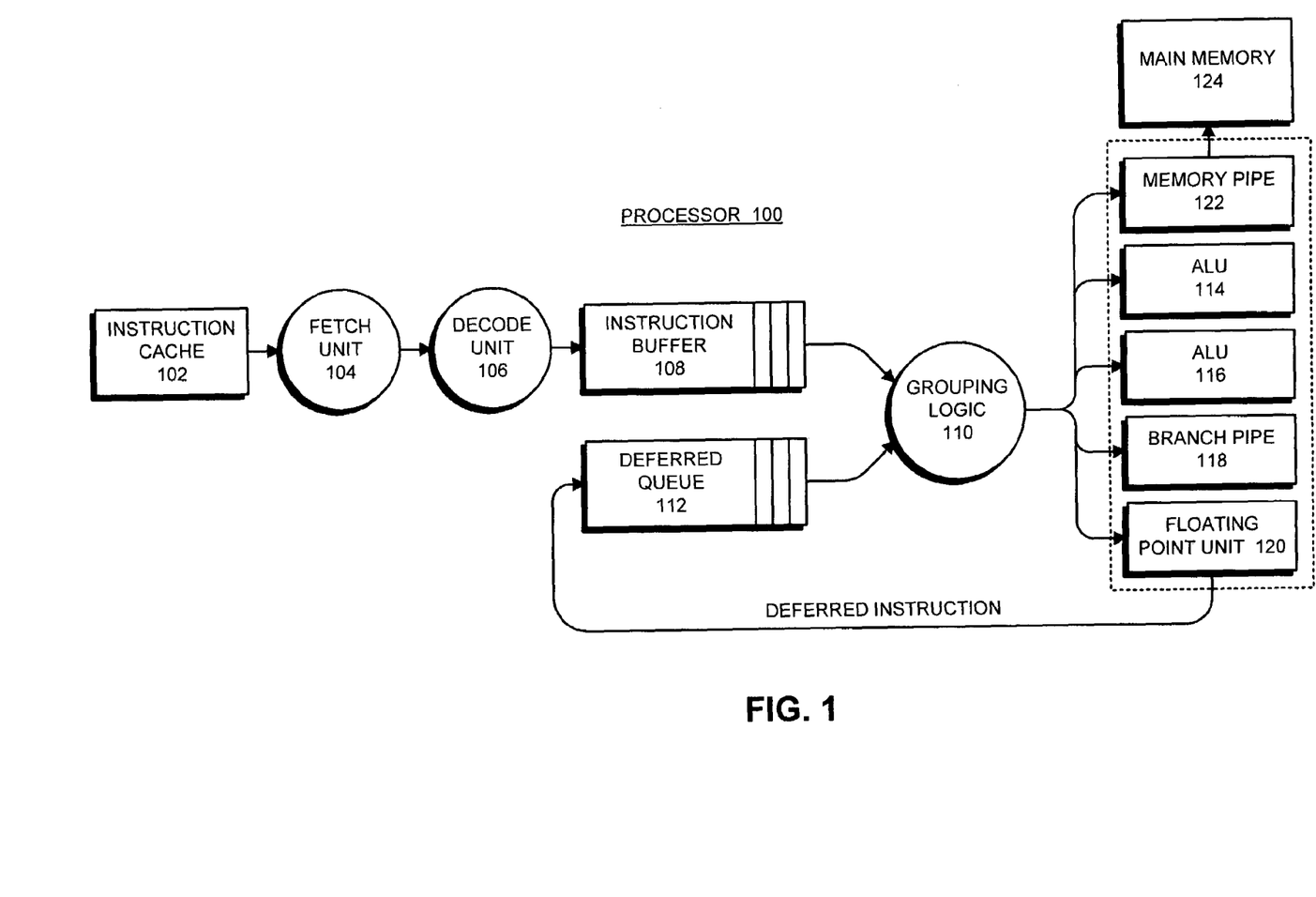
FIG. 1 illustrates the design of a processor that supports both SMT and SST operating modes in accordance with an embodiment of the present invention.

FIG. 1 illustrates the design of a processor 100 that supports both SMT and SST operating modes in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120, and memory pipe 122.

During operation, fetch unit 104 retrieves instructions to be executed from instruction cache 102, and feeds these instructions into decode unit 106. Decode unit 106 then forwards the instructions to be executed into instruction buffer 108, which is organized as a FIFO buffer. Next, instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Like instruction buffer 108, deferred queue 112 is organized as a FIFO buffer.

When the data dependency is eventually resolved, instructions from deferred queue 112 are executed in program order with respect to other deferred instructions 206, but not with respect to other previously executed non-deferred instructions.

Figure 2:
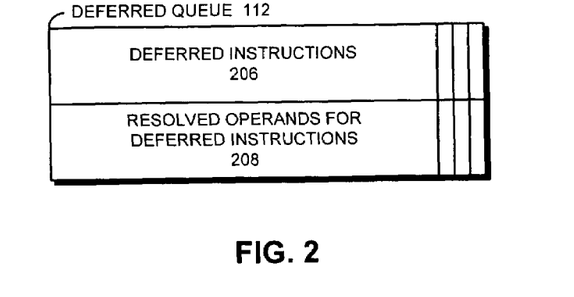
FIG. 2 illustrates a more detailed view of deferred queue in accordance with an embodiment of the present invention.

FIG. 2 illustrates a more detailed view of deferred queue 112 in accordance with an embodiment of the present invention. As was described above, deferred queue 112 stores deferred instructions 206 that are waiting for unresolved data dependencies to be resolved. In addition to storing deferred instructions 206, deferred queue 112 also stores any corresponding operands 208 that have already been resolved for the deferred instructions. When the deferred instructions 206 are finally executed in deferred mode, these deferred instructions 206 use the resolved source operands 208 from deferred queue 112. In this way, instructions following the deferred instructions that overwrite the resolved source operands do not create RAW hazards, because the deferred instructions use the previously stored resolved operands 208 for the deferred instructions from deferred queue 112.

Processor 100 supports multi-threading, which allows multiple threads of execution to run simultaneously on processor 100. The technical details of multi-threading are well-known in the art.

Processor 100 can be dynamically configured to operate in either SST mode or SMT mode. Hence, the two or more threads running on processor 100 can have their operating mode switched between SST and SMT modes as they execute. Processor 100 includes circuit structures that can be configured at runtime to support the different speculative-execution modes. Configuring the threads and the circuit structures for each mode is described in more detail in the following sections.

Speculative Multi-Threading Circuit Structures

Figure 3A:
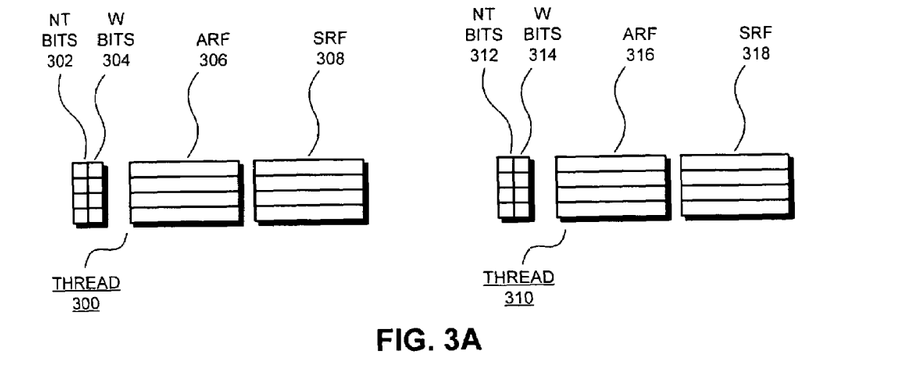
FIG. 3A illustrates circuit structures that support SMT on a processor in accordance with an embodiment of the present invention.

FIG. 3A illustrates circuit structures that support SMT on processor 100 in accordance with an embodiment of the present invention. During SMT, processor 100 executes instructions from two or more independent speculative execution threads. For the purpose of illustration, we discuss SMT using exemplary threads 300 and 310.

Because the threads on an SMT processor operate independently, each thread is associated with its own set of speculative-execution circuit structures. The circuit structures for thread 300 include architectural register file (ARF) 306, shadow register file (SRF) 308, "not-there" (NT) bits 302, and "write" (W) bits 304, while the circuit structures for thread 310 include ARF 316, SRF 318, NT bits 312, and W bits 314.

ARF 306 and ARF 316 are register files that contain operands which are manipulated by their respective threads. The values in the ARFs are either updated by a thread during normal-execution mode 402 (see FIG. 4) or are updated upon successful completion of execute-ahead mode 404. Hence, the ARFs contain the architectural values for the processor registers.

SRF 308 and SRF 318 are register files that contain a copy of each processor register. During speculative execution, a thread writes speculative results to the SRF, so that the results can be used during speculative execution without overwriting the architectural value in the ARF.

Figure 4:
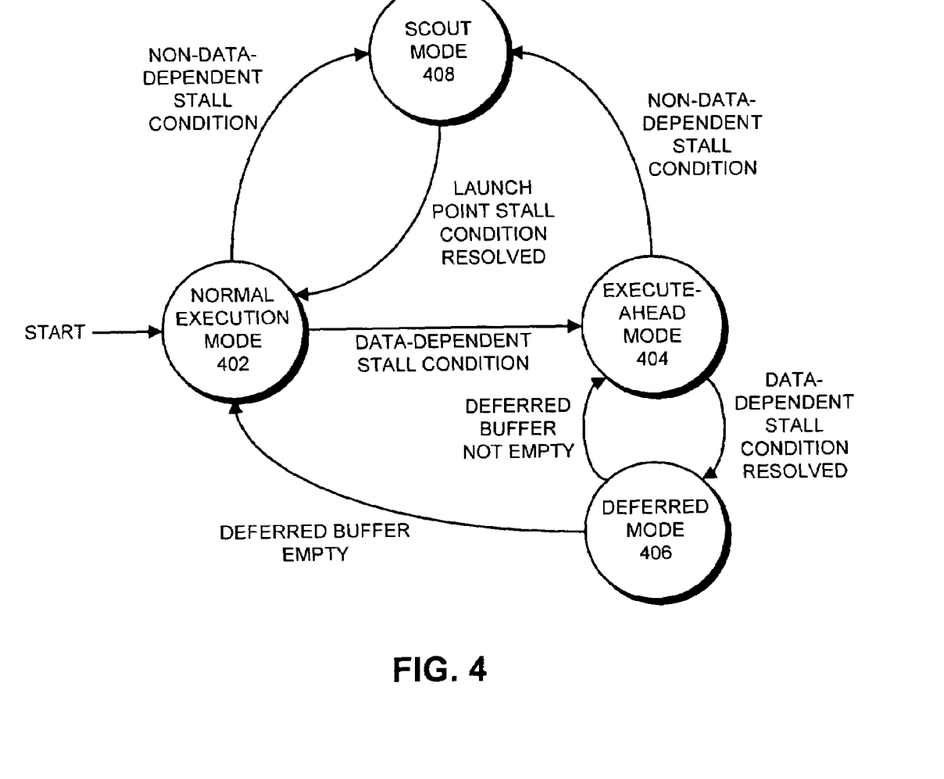
FIG. 4 presents a state diagram for threads on a processor which is configured for SMT in accordance with an embodiment of the present invention.

NT bits 302 and 312 include a "not-there" bit for each register. During execute-ahead mode 404, the threads use the NT bits to keep track of whether a valid data value is contained in each register in the SRF. For example, if an instruction is waiting for a source operand to be produced by a load miss, the instruction is deferred and the NT bit corresponding to the instruction's destination register in the SRF is set to indicate that the desired operand is not present in the destination register. When a subsequent instruction references a source operand value that is marked as not there, the system marks that instruction's destination register as not-there to indicate that the value in the destination register depends on the unresolved data-dependency.

W bits 304 and 314 include a "write" bit corresponding each register in the SRF. The "write" bits are used in the same way as the "not-there" bits, except that the "write" bits are used during deferred mode 406 instead of during execute-ahead mode 404. During deferred mode 406, a thread uses the "write" bits to keep track of whether a valid speculative data value is contained in a copy of the associated register in the SRF.

Simultaneous Speculative Threading Circuit Structures

Figure 3B:
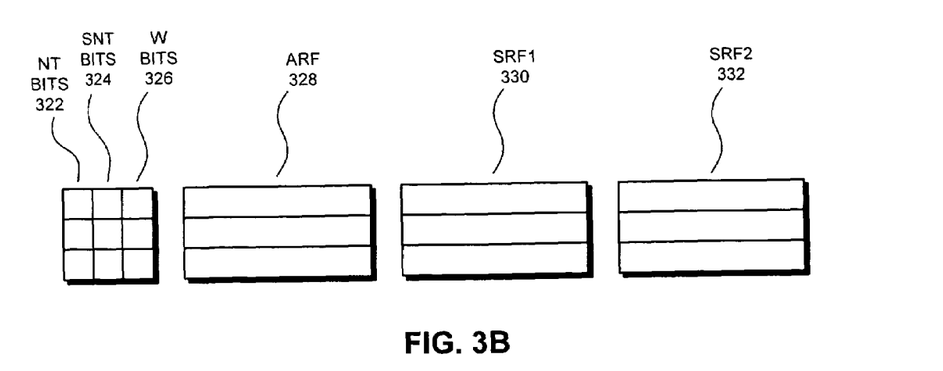
FIG. 3B illustrates circuit structures that support SST on a processor in accordance with an embodiment of the present invention.

FIG. 3B illustrates circuit structures that support SST on processor 100 in accordance with an embodiment of the present invention. For SST, processor 100 uses a pair of cooperating threads to facilitate speculative execution. One thread serves as a "primary" thread, which executes instructions in execute-ahead mode and defers instructions that cannot be executed due to unresolved data dependencies. The other thread serves as a "subordinate" thread, which waits for the resolution of data dependencies and then executes the associated deferred instructions.

Note that the threads are labeled as "primary" and "subordinate" only for the purposes of illustration. The threads do not have distinct properties. In other words, either of the threads could serve as the primary thread or subordinate thread. In addition, the label "primary" is not associated exclusively with one thread or the other; the designation can switch from one thread to the other at runtime.

The circuit structures in the SST processor include architectural register file (ARF) 328, shadow register file 1 (SRF1) 330, and shadow register file 2 (SRF2) 332. In addition, processor 100 includes "not-there" (NT) bits 322, speculative "not-there" bits (SNT) 324, and "write" (W) bits 326.

ARF 328 is a register file that contains the architecturally committed value for each processor register. The primary thread stores values to ARF 328 during normal-execution mode 502 (see FIG. 5A) or "joins" speculative results into the ARF 328 upon successful completion of execute-ahead mode 504.

Figure 5A:
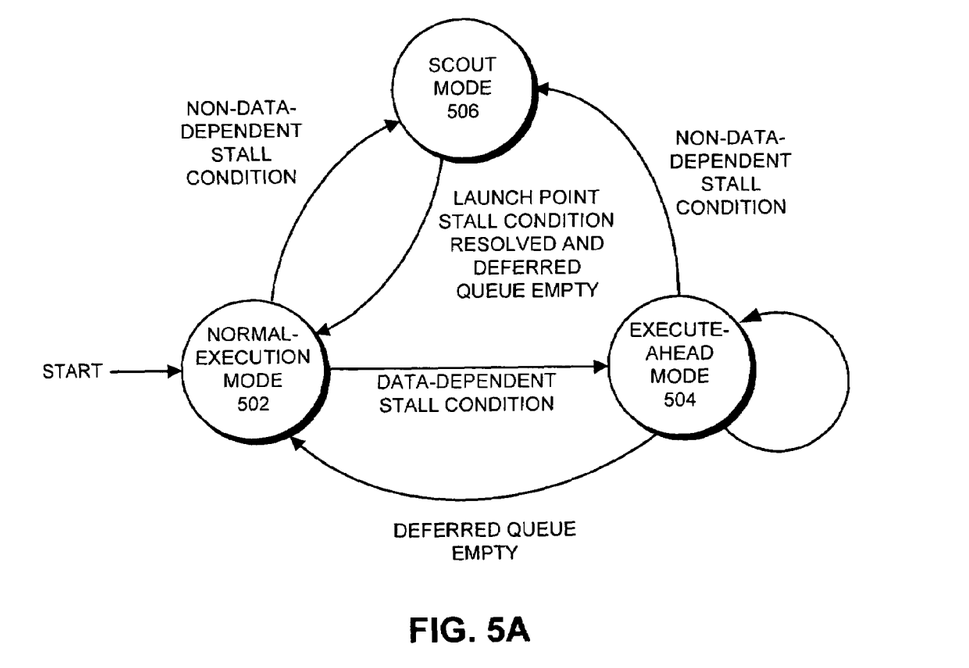
FIG. 5A presents a state diagram for a "primary" thread on a processor configured for SST in accordance with an embodiment of the present invention.

SRF1 330 and SRF2 332 are register files that include shadow copies of the registers in ARF 328. SRF1 330 and SRF2 332 serve as the register files for the primary and subordinate threads during speculative execution. For example, during execute-ahead mode 504, the primary thread can write speculative results to a copy of the register file, so that the speculative results can be used during execute-ahead mode 504 without overwriting the corresponding values in ARF 328. On the other hand, during deferred mode 512, the subordinate thread can write speculative results to another copy of the register file, so that the architectural values or speculative results written during execute-ahead mode 504 by the primary thread are not overwritten.

Note that the register files copies are not associated with either thread. For example, the primary thread may initially store results in SRF1 330 in execute-ahead mode 504, but after a second checkpoint is set, the primary thread begins storing results in SRF2 332. Then, when the subordinate thread executes the instructions deferred before the second checkpoint in deferred mode 506, the subordinate thread stores the results in SRF1 330. The following sections describe the use of the shadow copies of the register file in more detail.

NT bits 322 include a "not-there" bit corresponding to registers in the register file copies. During execute-ahead mode 504, the primary thread uses the NT bits 322 to keep track of whether a valid data value is contained in each register of the copy of the register file being used by the primary thread (e.g.i SRF1 330 or SRF2 332).

SNT bits 324 similarly include a "speculative not-there" bit corresponding to registers in the register file copies. During deferred mode 506, the subordinate thread uses SNT bits 324 to keep track of whether a valid data value was contained in each register of the copy of the register file being used by the primary thread (e.g., SRF1 330 or SRF2 332) as the subordinate thread commenced execution in deferred mode (to avoid a WAW hazard).

Figure 5B:
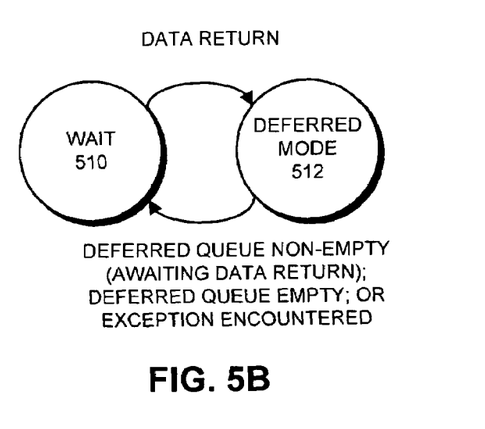
FIG. 5B presents a state diagram for a "subordinate" thread on a processor configured for SST in accordance with an embodiment of the present invention.

Write bits 326 include a "write" bit corresponding to each register in the register file. The "write" bits are used in the same way as SNT bits 324, except that "write" bits 326 are used by the subordinate thread during deferred mode 512. During deferred mode 512, the subordinate thread uses the "write" bits to keep track of whether a valid data value is contained in each register in the copy of the register file being used by the subordinate thread.

Speculative Multi-Threading State Diagram

FIG. 4 presents a state diagram for threads on a processor 100 which is configured for SMT in accordance with an embodiment of the present invention. A given thread starts in normal-execution mode 402, wherein instructions are executed in program order as they are issued from instruction buffer 108 (see FIG. 1).

Next, if an unresolved data dependency arises during execution of an instruction, the thread moves to execute-ahead mode 404. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 404, the thread generates a checkpoint that can be used, if necessary, to return execution of the process to the point where the unresolved data dependency was encountered; this point is referred to as the "launch point." (Generating the checkpoint involves saving architectural state information from processor 100 to facilitate subsequent recovery from exceptions that arise during speculative execution.) The thread also "defers" execution of the instruction that encountered the unresolved data dependency by storing the instruction in deferred queue 112. Note that copies of any operands that are available at the time that the instruction is deferred are placed in deferred queue 112 along with the instruction, thereby avoiding a read-after-write hazard (RAW) which may otherwise occur when the deferred instruction is subsequently executed in deferred mode 406. As the instruction is deferred, the thread asserts the NT bit 322 for the destination register for the instruction.

While operating in execute-ahead mode 404, the thread continues to execute instructions in program order as they are received from instruction buffer 108; any instructions that cannot execute because of an unresolved data dependency are deferred into deferred queue 112. As each instruction is deferred, the thread asserts the NT bit 322 for the destination register for the instruction.

During execute-ahead mode 404, if an unresolved data dependency is finally resolved, the thread moves into deferred mode 406, wherein the thread attempts to execute instructions from deferred queue 112 in program order. Note that the thread attempts to execute these instructions in program order with respect to other deferred instructions in deferred queue 112, but not with respect to other previously executed non-deferred instructions (and not with respect to deferred instructions executed in previous passes through deferred queue 112). During this process, the thread defers execution of deferred instructions that still cannot be executed because of unresolved data dependencies by placing these again-deferred instructions back into deferred queue 112. On the other hand, the thread executes other instructions that can be executed in program order with respect to each other. As each instruction is re-deferred, the primary thread asserts the W bit 304 for the destination register for the instruction.

During deferred mode 406, the thread determines if the destination register for an instruction has the NT bit 302 set. If the NT bit 302 is set, the thread does not write to the destination register, thereby avoiding a WAW hazard with subsequent results written during execute-ahead mode 404. Otherwise, the thread stores the result in the destination register.

After the thread completes a pass through deferred queue 112, if deferred queue 112 is empty, the thread moves back into normal-execution mode 402. This involves performing a "join" operation to commit changes made during execute-ahead mode 404 and deferred mode 406 to the architectural state of processor 100, if such changes have not been already committed. It can also involve discarding the checkpoint generated when the thread moved into execute-ahead mode 404.

On the other hand, if deferred queue 112 is not empty after the thread completes a pass through deferred queue 112, the thread returns to execute-ahead mode 404 to execute instructions from instruction buffer 108 from the point where execute-ahead mode 404 left off.

If a non-data dependent stall condition arises while the thread is in normal-execution mode 402 or in execute-ahead mode 404, the thread moves into scout mode 408. For example, this non-data-dependent stall condition can include a memory barrier operation, or a deferred queue full condition. In scout mode 408, instructions are speculatively executed to prefetch future memory operations, but results are not committed to the architectural state of processor 100.

Scout mode 408 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 408.

Unfortunately, computational operations performed during scout mode 408 need to be recomputed, which can require a large amount of computational work.

When the original "launch point" stall condition is finally resolved, the thread moves back into normal-execution mode 402, and, in doing so, uses the previously generated checkpoint to resume execution from the launch point instruction that encountered the launch point stall condition. The launch point stall condition is the stall condition that originally caused the thread to move out of normal-execution mode 402. For example, the launch point stall condition can be the data-dependent stall condition that caused the thread to move from normal-execution mode 402 to execute-ahead mode 404, before moving to scout mode 408. Alternatively, the launch point stall condition can be the non-data-dependent stall condition that caused the thread to move directly from normal-execution mode 402 to scout mode 408.

Simultaneous Speculative Threading State Diagram

FIG. 5A presents a state diagram for a "primary" thread on a processor configured for simultaneous speculative threading in accordance with an embodiment of the present invention. FIG. 5B presents a state diagram for an associated "subordinate" thread on a processor configured for simultaneous speculative threading in accordance with an embodiment of the present invention.

Referring to FIG. 5A, the primary thread starts in normal-execution mode 502, wherein the primary thread executes instructions in program order as they are issued from instruction buffer 108 (see FIG. 1). At the same time, referring to FIG. 5B, the subordinate thread starts in wait mode 510. While operating in normal-execution mode 502, the primary thread stores results to and reads values from ARF 328.

If a data-dependent stall condition arises during the execution of an instruction in normal-execution mode 502, the primary thread transitions to execute-ahead mode 504. While moving to execute-ahead mode 504, the primary thread generates an architectural checkpoint that can be used, if necessary, to return execution to the point (the "launch point") where the data-dependent stall condition was encountered. Generating the checkpoint involves saving architectural state information from processor 100 to facilitate subsequent recovery from exceptions that arise during execute-ahead mode 504 or deferred mode 512.

Along with generating the checkpoint, the primary thread "defers" execution of the instruction that encountered the unresolved data dependency by storing the instruction in deferred queue 112. Note that copies of the operands that are available at the time that the instruction is deferred are placed in deferred queue 112 along with the instruction, thereby avoiding a read-after-write (RAW) hazard which may otherwise occur when the deferred instruction is subsequently executed in deferred mode 512. As the instruction is deferred, the primary thread asserts the NT bit 322 for the destination register for the instruction.

While operating in execute-ahead mode 504, the primary thread continues to execute instructions in program order as they are received from instruction buffer 108, and in doing so defers any instruction that cannot execute because of an unresolved data dependency by storing the instruction in deferred queue 112 along with copies of the available instruction operands. As each instruction is deferred, the primary thread asserts the NT bit 322 for the destination register for the instruction. (Note that if a register with the NT bit 322 set is subsequently written in execute-ahead mode 504, the primary thread clears the NT bit 322.)

During execute-ahead mode 504, the primary thread stores the results from the speculative execution of instructions to a copy of the shadow register files (i.e., either SRF1 330 or SRF2 332). (For the purposes of illustration, we assume that the primary thread stores speculative results into SRF1 330.) Furthermore, the primary thread initially reads the inputs for instructions from ARF 328. However, as speculative results are written into SRF1 330, the subordinate thread uses the speculative results as inputs.

When a data dependency is resolved during execute-ahead mode 504, the system signals the subordinate thread to leave wait mode 510 and to commence execution in deferred mode 512. In deferred mode 512, the subordinate thread attempts to execute each of the deferred instructions in deferred queue 112. In doing so, the subordinate thread attempts to execute these instructions in program order with respect to other deferred instructions in deferred queue 112; but not with respect to non-deferred instructions previously executed by the primary thread, and not with respect to deferred instructions executed in any other passes through deferred queue 112. During deferred mode 512, the subordinate thread re-defers deferred instructions that still cannot be executed because of unresolved data dependencies by placing the re-deferred instructions back into deferred queue 112 in program order along with a copy of the available instruction operands. During deferred mode 512, the subordinate thread uses the W bit 326 to track which registers contain valid data values (i.e., which registers were speculatively written versus which registers are the destination registers for re-deferred instructions).

Before the subordinate thread commences the execution of deferred instructions from deferred queue 112, the primary thread updates a "deferred queue indicator" associated with deferred queue 112. This indicator prevents the subordinate thread from executing deferred instructions which were deferred by the primary thread while the subordinate thread executes in deferred mode 506.

In addition, the primary thread generates a "speculative" checkpoint. As with generating an architectural checkpoint, generating a speculative checkpoint involves saving architectural state information from processor 100 to facilitate subsequent recovery from exceptions. The speculative checkpoint is initially "inactive," meaning that processor 100 does not return to the speculative checkpoint in the event of an exception. Instead, processor 100 returns to the architectural checkpoint in the event of an exception. The architectural checkpoint remains the active checkpoint until all of the deferred instructions in the program code between the architectural checkpoint and the speculative checkpoint are executed by the subordinate thread in deferred mode 512. When these deferred instructions are successfully executed, processor 100 removes the architectural checkpoint and activates the speculative checkpoint. In this way, the speculative checkpoint becomes the architectural checkpoint—the checkpoint that processor 100 returns to in the event of an exception.

The primary thread retains the architectural checkpoint until the speculative checkpoint is properly updated because the subordinate thread could encounter an exception while executing the deferred instructions in deferred mode 512. In the event that the subordinate thread encounters such an exception, the subordinate thread signals the primary thread that an exception has occurred. The subordinate thread then halts execution in deferred mode 512 and resumes wait mode 510. Upon receiving this signal, the primary thread restores the architectural checkpoint and resumes execution in normal-execution mode 502.

Because the architectural checkpoint still exists, the speculative checkpoint is an additional checkpoint which must be maintained by processor 100. Hence, processor 100 must support multiple checkpoints. A system that supports multiple checkpoints on a single processor is described in more detail in a pending U.S. patent application entitled, "The Generation of Multiple Checkpoints in a Processor that Supports Speculative Execution," by inventors Shailender Chaudhry, Marc Tremblay, and Paul Caprioli having Ser. No. 11/084,655, and filing date 18 Mar. 2005, and which is hereby incorporated by reference to describe implementation details involved in supporting multiple checkpoints.

While generating the speculative checkpoint, the system copies the NT bits 322 into the SNT bits 324, thereby capturing the "not-there" state of the registers (i.e., the not-there state existed when the checkpoint was generated) in SRF1 330. Then, before speculatively writing a result to a shadow copy of the register in deferred mode 506, the subordinate thread determines if the SNT bit 324 is set for the register. If the SNT bit 324 is not set, the subordinate thread does not store the result, thereby preventing the subordinate thread from overwriting a subsequent speculative result written by the primary thread in execute-ahead mode 504 (avoiding a WAW hazard). Otherwise, the subordinate thread stores the result.

As the subordinate thread executes in deferred mode 512, the primary thread continues to execute instructions in execute-ahead mode 504, and in doing so, defers any instructions that cannot execute because of unresolved dependencies to deferred queue 112. As each instruction is deferred, the primary thread asserts the NT bit 322 for the destination register for the instruction.

Although continuing to operate in execute-ahead mode 504, the primary thread begins to write the speculative results into the other copy of the shadow register file. For example, if the primary thread was originally writing the results of speculative execution into SRF1 330, after setting the speculative checkpoint, the primary thread begins to write the results into SRF2 332. At the same time, the subordinate thread writes the results from deferred mode 506 execution into the SRF1 330.

After a pass through deferred queue 112 in deferred mode 512, some re-deferred instructions may remain in deferred queue 112. If so, the subordinate thread shifts to wait mode 510 and waits for another data return before executing the re-deferred instructions. When another data return occurs, the subordinate thread leaves wait mode 510 and commences executing in deferred mode 512, and in doing so, makes another pass through deferred queue 112. The subordinate thread continues to make passes through deferred queue 112 until all the deferred instructions (at locations before the deferred queue indicator) in deferred queue 112 have been executed.

When the deferred instructions before the deferred queue indicator have been executed, the subordinate thread asserts the deferred-queue-empty signal, which is communicated to the primary thread. The subordinate thread then returns to wait mode 510. Upon receiving this signal, the system merges the results of speculative-execution (produced during both execute-ahead mode 504 and deferred mode 506) with the results already present in the architectural checkpoint. Then, the system discards the architectural checkpoint and "activates" the speculative-checkpoint. The system also clears the SNT bits 324 and the W bits 326.

The primary thread then checks the status of deferred queue 112. If the primary thread deferred instructions into deferred queue 112 while the subordinate thread was executing in deferred mode 512, the primary thread continues to operate in execute-ahead mode 504. When data returns for the deferred instructions, the primary thread signals the subordinate thread to leave wait mode 510 and to commence execution in deferred mode 512 as described in the preceding paragraphs.

Until the deferred queue is completely empty, the threads may continuously repeat this pattern of operation. Hence, the primary thread may continue to execute instructions which can be executed and defer those which cannot be executed due to an unresolved data dependency, while the subordinate thread trails the primary thread, executing the deferred instructions when data returns for these instructions.

Otherwise, the subordinate thread eventually completely empties deferred queue 112. When the subordinate thread empties deferred queue 112, the primary thread discards all checkpoints, joins the results of speculative execution with the architectural state of the processor and returns to normal-execution mode 502. When the primary thread returns to normal-execution mode 502, the subordinate thread remains in wait mode 510.

Register Windows

In the following sections, we describe a processor that supports "register windows." In a processor that supports register windows, the processor includes multiple copies of the register file, each of which is referred to as a "register window." For example, register file (RF) 608 (see FIG. 6A) is a register window in register bank 600.

Figure 6A:
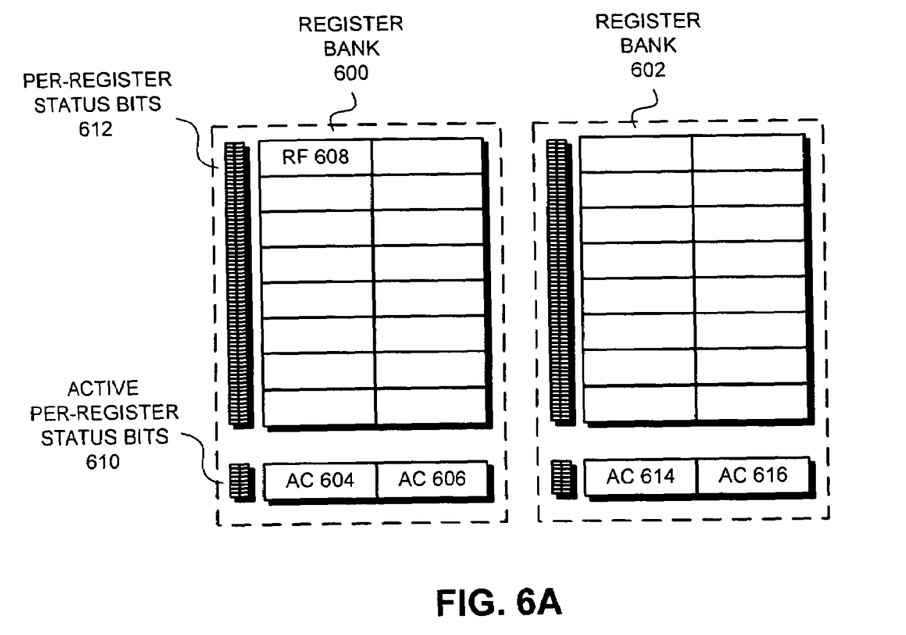
FIG. 6A illustrates circuit structures on a SMT processor.

In addition to the register file copies, there is an "active cell," such as active cell (AC) 604 in register bank 600. The active cell is an additional copy of the register files which serves as an interface to the register bank. The active cell has a number of read and write ports which allow threads on the processor to read from and write to the registers in the active cell. The active cell is the only copy of the register file that is configured in this way; the remaining register files only have single read and write ports from and to the active cell.

During operation, a thread acquires a register window if the thread requires a set of processor registers. For example, when a thread commences the execution of a method within an application, the thread can request a clean copy of the register file. When the thread requests the register file, the processor can store the register file which is currently in the active cell in the register bank and can copy the desired register file into the active cell. Alternatively, the thread can copy the desired register file into the active cell, overwriting the register file that was in the active cell.

Although embodiments of the present invention are disclosed using a processor that supports register windowing, alternative embodiments are envisioned that do not support register windowing. These embodiments operate under the same principles as a processor that supports register windows.

SMT Processor Circuit Structures

FIG. 6A illustrates circuit structures on a SMT processor. The circuit structures include register bank 600 and register bank 602. Register bank 600 includes exemplary register file (RF) 608, as well as "active cell" (AC) 604 and AC 606. In addition, the circuit structures include register bank 602 with AC 614 and AC 616, per-register status bits 612, and active per-register status bits 610.

During operation, the active cells 604 and 606 serve as the register file for one thread on the SMT processor, while AC 614 and 616 serve as the register file for another thread. For example, when thread 300 (see FIG. 3A) is operating in execute-ahead mode 404 (see FIG. 4), AC 604 can serve as ARF 306 for thread 300, while AC 606 serves as SRF 308 for thread 300.

The per-register status bits 612 contain the NT bits 302 and the W bits 304 for the register file copies. There is a copy of the per-register status bits for each register file stored along with the copy of the register file. When the copy of the register file is moved into the active cell, the corresponding copy of the status bits is also moved into the "active" per-register status bits 610.

Note that no direct communication is permitted between the threads on an SMT processor. That is, the results calculated by one thread are not communicated directly to the other thread. For example, there is no communication between register bank 600 and register bank 602 in the exemplary circuit structures. In other words, there are no ports in the register files or active cells that allow the active cells to read from and write to the register files in another register bank.

SST Processor Circuit Structures

Figure 6B:
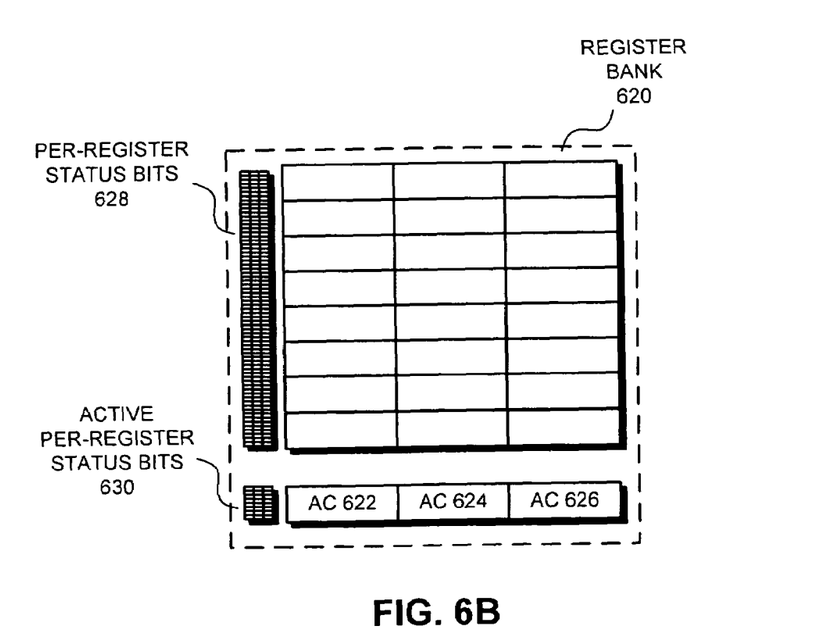
FIG. 6B illustrates circuit structures on a SST processor.

FIG. 6B illustrates circuit structures on a SST processor. The circuit structures include register bank 620, per-register status bits 628, active per-register status bits 630, and AC 622, 624, and 626.

During operation, the AC 622 and 624 serve as the shadow register file copies for the SST processor. For example, AC 624 can serve as SRF1 330, while AC 626 serves as SRF2 332.

The per-register status bits 628 contain the NT bits 322 (see FIG. 3B), the SNT bits 324, and the W bits 304 for the register file copies. Note that there is a copy of the per-register status bits for each register file stored along with the copy of the register file. When the copy of the register file is moved into the active cell, the corresponding copy of the status bits is also moved into the "active" per-register status bits 630.

Configurable Circuit Structures

Figure 7A:
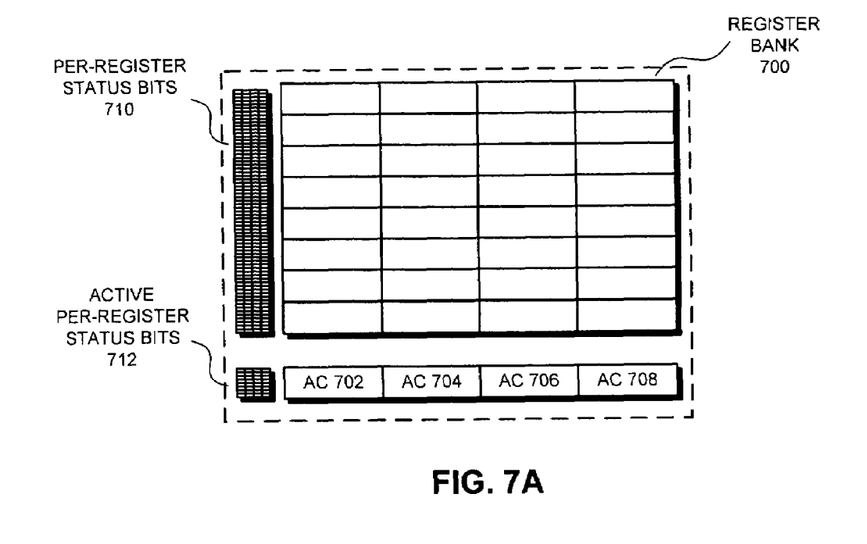
FIG. 7A illustrates configurable circuit structure on a processor that supports both SMT and SST in accordance with an embodiment of the present invention.

FIG. 7A illustrates configurable circuit structure on a processor that supports both SMT and SST in accordance with an embodiment of the present invention. The circuit structure includes register bank 700 which, in turn, includes a set of copies of the register file, four "active cells" (AC) 702-708, per-register status bits 710, and "active" per-register status bits 712. These circuit structures facilitate switching processor 100 between SMT mode and SST mode at runtime.

Figure 7B:
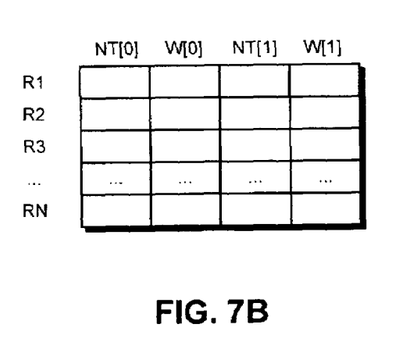
FIG. 7B illustrates a per-register status bit circuit structure on a processor that supports both SMT and SST in accordance with an embodiment of the present invention.
Figure 7C:
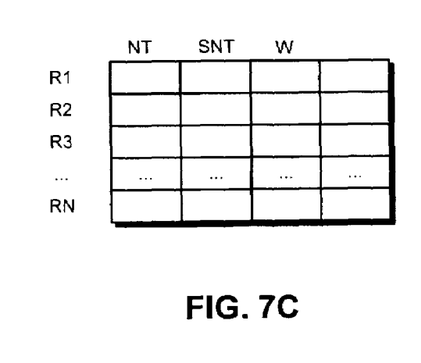
FIG. 7C illustrates a per-register status bit circuit structure on a processor that supports both SMT and SST in accordance with an embodiment of the present invention.

Similarly to the register files illustrated in FIGS. 6A and 6B, there is a copy of the per-register status bits 710 for each register file stored along with the copy of the register file. Moreover, when the copy of the register file is moved into the active cell, the corresponding copy of the status bits is similarly moved into active per-register status bits 712. An expanded view of the per-register status window containing status bits for a register file is illustrated in FIGS. 7B and 7C. The per register status window illustrated in FIG. 7B is configured for operation in SMT mode, while the per-register status window in FIG. 7C is configured for operation in SST mode.

Processor 100 also includes a "mode indicator," such as a bit, which controls the operating mode of the threads on the processor. When the mode indicator is toggled, processor 100 switches the operating mode of the threads. During operation, an application running on processor 100 may examine the mode indicator and determine that processor 100 is configured for a mode that is not well-suited to the application. The application can then toggle the mode indicator, to switch the operating mode of the processor to a more suitable mode.

When switching the operating mode of the threads, processor 100 reconfigures register bank 700 and per-register status bits 710 to support the operating mode. For example, if the mode indicator specifies that the processor is operating in the SMT mode, AC 702 is configured as the ARF 306 (see FIG. 3A) and AC 704 is configured as the SRF 308 for thread 300, while AC 706 is configured as the ARF 316 and the SRF 318 for thread 310. In other words, AC 702 and AC 704 (and their associated copies of the register file) function as a virtual SMT "register bank" (see register bank 600, FIG. 6A), and AC 706 and AC 708 (and their associated copies of the register file) function as another virtual SMT "register bank" (see register bank 602, FIG. 6A). In addition, as shown in FIG. 7B, when processor 100 is configured for operation in SMT mode, active per-register status bits 712 are configured so that the first two columns in the array are the NT bits 302 and W bits 304 for thread 300, while the second two columns are the NT bits 312 and W bits 314 for thread 310.

On the other hand, if the mode indicator specifies that the processor is operating in the SST mode, AC 702 is configured as the ARF 328 (see FIG. 3B), AC 704 is configured as SRF1 330, and AC 706 is configured as the SRF2 332. (AC 708 is unused in SST mode.) Together with their associated copies of the register file, the active cells function as a virtual SST "register bank" (see register bank 620, FIG. 6B). In addition, as shown in FIG. 7C, when processor 100 is configured for operation in SST mode, per-register status bits are configured so that the first column are the NT bits 322 for the primary thread, the second and third columns are the SNT bits 324 and W bits 326 for the subordinate thread, and the fourth column is unused.

Each active cell in register bank 700 includes read and write ports to all register file copies in register bank 700. In other words, each active cell can access any register file copy in register bank 700. For example, in embodiments of the present invention, active cell 706 has sufficient ports to serve both as ARF 316 in SMT mode and SRF2 332 in SST mode. In contrast, in processor that supports only SMT, a similarly positioned active cell (such as active cell 614 in FIG. 6A) lacks the ports to access register file copies in the other register bank and therefore the processor is incapable of supporting operation in SST mode.

Configuring the Processor

Figure 8:
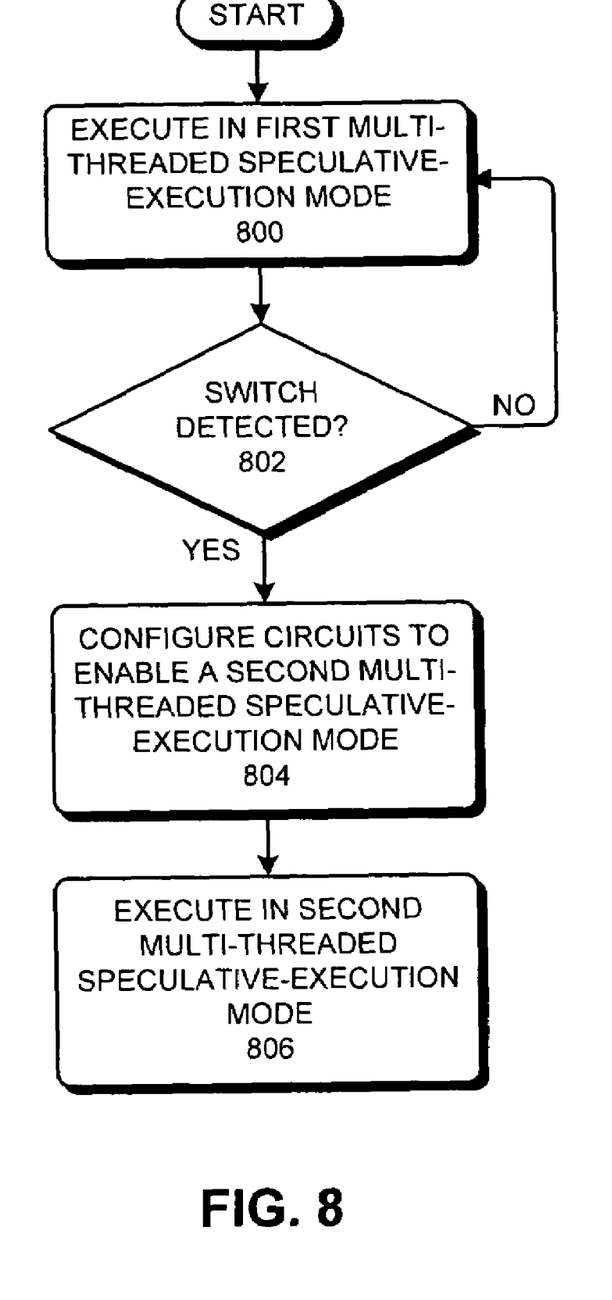
FIG. 8 presents a flowchart illustrating the process of changing the speculative operating mode of a processor in accordance with an embodiment of the present invention.

FIG. 8 presents a flowchart illustrating the process of switching the speculative operating mode of a processor in accordance with an embodiment of the present invention. The process starts with the threads executing instructions in a first multi-threaded speculative execution mode, such as SST or SMT (step 800).

Next, processor 100 determines if a "mode indicator" has been switched from its previous value (step 802). If not, processor 100 returns to step 800 and continues executing instructions in the first multi-threaded speculative execution mode.

If so, processor 100 reconfigures the circuits to enable a second multi-threaded speculative execution mode (step 804). As described in the preceding section, configuring the circuits involves configuring register banks and per-register status bits to support the second multi-threaded speculative execution mode. The threads then commence operation in the second multi-threaded speculative execution mode (step 804).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting different modes of multi-threaded speculative execution on a processor, comprising:
    executing two or more threads in a first multi-threaded speculative-execution mode;
    switching to a second multi-threaded speculative-execution mode by configuring circuits in the processor to enable the second multi-threaded speculative-execution mode; and
    switching the threads from executing in the first multi-threaded speculative-execution mode to executing in the second multi-threaded speculative-execution mode;
    wherein configuring the circuits involves configuring a per-register status indicator array to enable the per-register status indicator array to store status information for the second multi-threaded speculative-execution mode.

2. The method of claim 1, wherein the multi-threaded speculative-execution modes include:
    a simultaneous speculative threading mode, wherein each thread on the processor operates independently of other threads on the processor and wherein each thread supports all forms of speculative-execution; or
    a simultaneous multi-threaded mode, wherein at least one primary thread executes instructions in a normal mode and an execute-ahead mode and at least one additional thread executes instructions deferred by the primary thread in a deferred mode.

3. The method of claim 2, wherein the forms of speculative-execution include:
    the execute-ahead mode, wherein instructions that cannot be executed because of an unresolved data dependency are deferred and other non-deferred instructions are executed in program order;
    the deferred mode, wherein deferred instructions are executed in program order and deferred instructions that still cannot be executed because of unresolved data dependencies are deferred again; and
    a scout mode, wherein instructions are executed to prefetch loads and stores, but results of the instructions are not committed to an architectural state of the processor.

4. The method of claim 3, wherein configuring circuits further involves:
    configuring a group of register file copies to facilitate reads and writes between the register file copies used by the second multi-threaded speculative-execution mode.

5. The method of claim 1, wherein the status information for the second multi-threaded speculative-execution mode includes dependency information.

6. The method of claim 1, wherein operating in the first multi-threaded speculative-execution mode involves monitoring a mode indicator, and if the mode indicator changes state, switching the processor to the second multi-threaded speculative-execution mode.

7. An apparatus for supporting different modes of multi-threaded speculative execution on a processor, comprising:
a plurality of threads within the processor configured to execute in a first multi-threaded speculative-execution mode; and
a switching mechanism within the processor configured to switch the threads to a second multi-threaded speculative-execution mode by configuring circuits in the processor to enable the second multi-threaded speculative-execution mode and by switching the threads from executing in the first multi-threaded speculative-execution mode to executing in the second multi-threaded speculative-execution mode;
wherein the switching mechanism configures circuits by configuring a per-register status indicator array to enable the per-register status indicator array to store status information for the second multi-threaded speculative-execution mode.

8. The apparatus of claim 7, wherein the multi-threaded speculative-execution modes include:
a simultaneous speculative threading mode, wherein each thread on the processor operates independently of other threads on the processor and wherein each thread supports all forms of speculative-execution; or
a simultaneous multi-threaded mode, wherein at least one primary thread executes instructions in a normal mode and an execute-ahead mode and at least one additional thread executes instructions deferred by the primary thread in a deferred mode.

9. The apparatus of claim 8, wherein the forms of speculative-execution include:
the execute-ahead mode, wherein instructions that cannot be executed because of an unresolved data dependency are deferred and other non-deferred instructions are executed in program order;
the deferred mode, wherein deferred instructions are executed in program order and deferred instructions that still cannot be executed because of unresolved data dependencies are deferred again; and
a scout mode, wherein instructions are executed to prefetch loads and stores, but results of the instructions are not committed to an architectural state of the processor.

10. The apparatus of claim 9, wherein the switching mechanism further configures circuits by:
configuring a group of register file copies to facilitate reads and writes between the register file copies used by the second multi-threaded speculative-execution mode.

11. The apparatus of claim 7, wherein the status information for the second multi-threaded speculative-execution mode includes dependency information.

12. The apparatus of claim 7, wherein the switching mechanism is configured to monitor a mode indicator while the threads are operating in the first multi-threaded speculative-execution mode, and if the mode indicator changes state, the switching mechanism is configured to switch the processor to the second multi-threaded speculative-execution mode.

13. A computer system for supporting different modes of multi-threaded speculative execution on a processor, comprising:
the processor;
a memory coupled to the processor, wherein the memory stores data and instructions for the processor;
a plurality of threads within the processor configured to execute in a first multi-threaded speculative-execution mode; and
a switching mechanism within the processor configured to switch the threads to a second multi-threaded speculative-execution mode by configuring circuits in the processor to enable the second multi-threaded speculative-execution mode and by switching the threads from executing in the first multi-threaded speculative-execution mode to executing in the second multi-threaded speculative-execution mode;
wherein the switching mechanism configures circuits by configuring a per-register status indicator array to enable the per-register status indicator array to store status information for the second multi-threaded speculative-execution mode.

14. The computer system of claim 13, wherein the multi-threaded speculative-execution modes include:
a simultaneous speculative threading mode, wherein each thread on the processor operates independently of other threads on the processor and wherein each thread supports all forms of speculative-execution; or
a simultaneous multi-threaded mode, wherein at least one primary thread executes instructions in a normal mode and an execute-ahead mode and at least one additional thread executes instructions deferred by the primary thread in a deferred mode.

15. The computer system of claim 14, wherein the forms of speculative-execution include:
the execute-ahead mode, wherein instructions that cannot be executed because of an unresolved data dependency are deferred and other non-deferred instructions are executed in program order;
the deferred mode, wherein deferred instructions are executed in program order and deferred instructions that still cannot be executed because of unresolved data dependencies are deferred again; and
a scout mode, wherein instructions are executed to prefetch loads and stores, but results of the instructions are not committed to an architectural state of the processor.

16. The computer system of claim 15, wherein the switching mechanism further configures circuits by:
configuring a group of register file copies to facilitate reads and writes between the register file copies used by the second multi-threaded speculative-execution mode.

17. The computer system of claim 13, wherein the status information for the second multi-threaded speculative-execution mode includes dependency information.

18. The computer system of claim 13, wherein the switching mechanism is configured to monitor a mode indicator while the threads are operating in the first multi-threaded speculative-execution mode, and if the mode indicator changes state, the switching mechanism is configured to switch the processor to the second multi-threaded speculative-execution mode.

* * * * *